United States Patent
Mottaez et al.

(10) Patent No.: US 8,707,242 B2
(45) Date of Patent: Apr. 22, 2014

(54) OPTIMIZING A CIRCUIT DESIGN FOR DELAY USING LOAD-AND-SLEW-INDEPENDENT NUMERICAL DELAY MODELS

(75) Inventors: Amir H. Mottaez, Los Altos, CA (US); Mahesh A. Iyer, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/563,316

(22) Filed: Jul. 31, 2012

(65) Prior Publication Data

US 2014/0040851 A1 Feb. 6, 2014

(51) Int. Cl.
*G06F 17/50* (2006.01)

(52) U.S. Cl.
USPC .......................................... 716/132; 716/134

(58) Field of Classification Search
USPC .................................................. 716/132, 134
See application file for complete search history.

(56) References Cited

U.S. PATENT DOCUMENTS

| | | | | |
|---|---|---|---|---|
| 5,619,418 A | * | 4/1997 | Blaauw et al. | 716/113 |
| 5,793,643 A | * | 8/1998 | Cai | 716/112 |
| 6,074,429 A | * | 6/2000 | Pullela et al. | 716/113 |
| 2009/0089721 A1 | * | 4/2009 | Alpert et al. | 716/2 |

* cited by examiner

*Primary Examiner* — Vuthe Siek
(74) *Attorney, Agent, or Firm* — Park, Vaughan, Fleming & Dowler LLP; Laxman Sahasrabuddhe (57) ABSTRACT

Systems and techniques are described for optimizing a circuit design. Specifically, gate sizes in the circuit design are optimized by iteratively performing a set of operations that include, but are not limited to: selecting a portion of the circuit design (e.g., according to a reverse-levelized processing order), selecting an input-to-output arc of a driver gate in the portion of the circuit design, selecting gates in the portion of the circuit design for optimization, modeling a gate optimization problem based on the selected input-to-output arc of the driver gate and the selected gates, solving the gate optimization problem to obtain a solution using one or more solvers, and discretizing the solution. Discretizing the solution involves identifying library cells that exactly or closely match the gate sizes specified in the solution. These library cells can then be used to model other gate optimization problems in the current or subsequent iterations.

20 Claims, 4 Drawing Sheets

OPTIMIZING A CIRCUIT DESIGN FOR DELAY USING LOAD-AND-SLEW-INDEPENDENT NUMERICAL DELAY MODELS

BACKGROUND

1. Technical Field

This disclosure relates to electronic design automation (EDA). More specifically, this disclosure relates to optimizing a circuit design for delay using load-and-slew-independent numerical delay models.

2. Related Art

The goal of circuit synthesis is to convert a high-level description of a circuit design into an implementation that meets a set of timing constraints, and at the same time optionally optimizes one or more metrics, such as area, leakage power, etc.

Some circuit synthesis approaches create an initial circuit design at a given abstraction level (e.g., a logical or physical design). Next, a cell is identified in the circuit design for optimization based on the metrics that are desired to be optimized. An optimal size for the identified cell is then determined by iteratively replacing the identified cell with functionally equivalent cells that have different sizes (this optimization process is also referred to as "sizing the cell," "sizing the gate," etc.). For each replacement cell size that is tried, the circuit synthesis approach updates timing information, and rejects cell sizes for which one or more timing constraints are violated. The iterative optimization process typically terminates after the optimization process has executed for a certain number of iterations or for a certain amount of time.

Unfortunately, such iterative trial-and-error based circuit synthesis approaches either take too long to complete and/or produce poor quality results for large circuit designs in which timing constraints are checked across many process corners and modes.

The cell delay can be represented using the following expression:

$$d = R \cdot C_o + p \quad (1)$$

where, R is the output resistance of the cell, $C_o$ is the output loading, and p is the parasitic delay of the cell. Equation (1) can then be rewritten as:

$$d = (R \cdot C_i) \cdot \left(\frac{C_o}{C_i}\right) + p, \quad (2)$$

where, $C_i$ is the input capacitance presented by the cell at one of its input terminals.

A circuit synthesis approach that is different from iterative trial-and-error approaches is described in Ivan Sutherland, Robert F. Sproull, and David Harris, *Logical Effort: Designing Fast CMOS Circuits*, Morgan Kaufmann, 1999. This approach uses the following linear cell delay model:

$$d = g \cdot h + p, \quad (3)$$

where, g represents the logical effort, h represents the electrical effort, and p represents the parasitic delay of the cell. The logical effort captures the effect of the cell's topology on its ability to produce output current. The logical effort is independent of the size of the transistors in the circuit. The electrical effort describes how the electrical environment of the cell affects performance, and how the size of the transistors in the cell determines its load-driving capability. The parasitic delay is a form of delay overhead that accompanies any gate. The logical effort g and the parasitic delay p can be normalized, e.g., they can be normalized with respect to the logical effort and parasitic delay values, respectively, of a reference inverter.

Comparing Equations (2) and (3) we note that the first term $(R \cdot C_i)$ represents the logical effort g, and the second term $$\left(\frac{C_o}{C_i}\right)$$

represents the electrical effort h.

The delay model that is used by a circuit synthesis approach must be accurate, i.e., it must accurately model the actual cell delays. If the delay model is inaccurate, the circuit implementation produced by the circuit synthesis approach will likely contain many timing violations. In the above-mentioned work by Sutherland et al., the authors state that the linear delay model is approximate, i.e., it does not accurately model the actual cell delays.

SUMMARY

Some embodiments described herein provide techniques and systems for optimizing a circuit design for delay using load-and-slew-independent numerical delay models. Specifically, gate sizes in the circuit design are optimized by iteratively performing a set of operations that include, but are not limited to: (1) selecting a portion of the circuit design that includes a driver gate and one or more gates in a fan-out cone of an output of the driver gate, (2) selecting an input-to-output arc of a driver gate in the portion of the circuit design, (3) selecting gates in the portion of the circuit design for optimization, (4) modeling a gate optimization problem based on the selected input-to-output arc of the driver gate and the selected gates, (5) solving the gate optimization problem to obtain a solution, and (6) discretizing the solution. Discretizing the solution involves identifying library cells that exactly or closely match the gate sizes specified in the (continuous) solution. These discrete library cells can then be used to model the gate optimization problem for other cells in the same iteration or in the next iteration (assuming another iteration is performed).

The gate optimization problem is modeled using a specific numerical delay model for the driver gate and generic numerical delay models for the selected gates. Using a specific numerical delay model for the driver gate (as opposed to using a generic numerical delay model for the driver gate) significantly improves the quality of results produced by the optimization.

In general, any wire load model can be used while modeling the gate optimization problem. Examples of wire load models include, but are not limited to, an Elmore wire load model, a best case wire load model, a worst case wire load model, and a balanced-tree wire load model.

Once the gate optimization problem has been modeled, it can be solved using a numerical solver. In some embodiments, the numerical solver is a conjugate-gradient based numerical solver. Some embodiments estimate gate sizes for the selected gates based on a set of closed-form expressions, and provide the estimated gate sizes as a seed to the numerical solver.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality of the circuit design. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Numerical Synthesis

Figure 1:
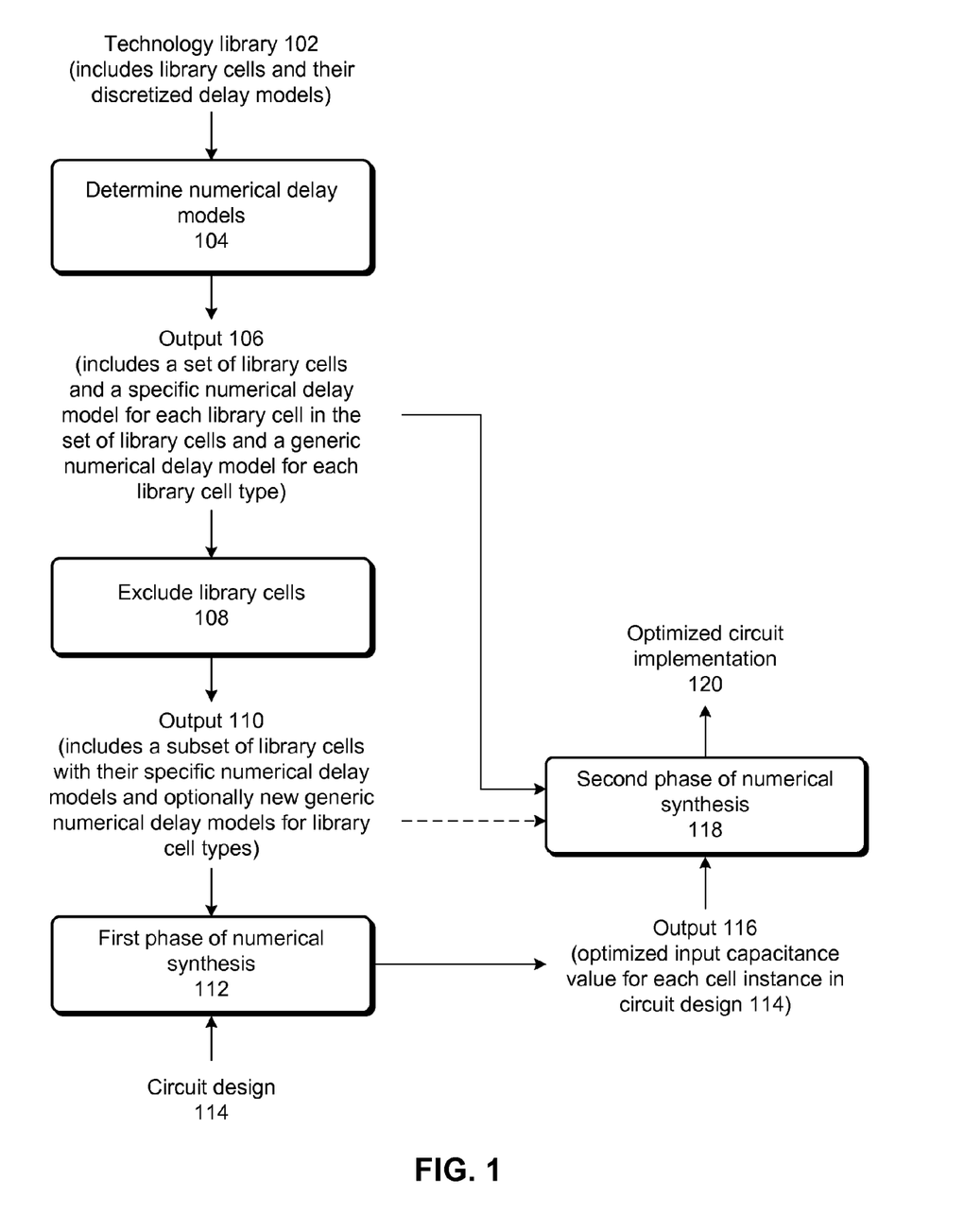
FIG. 1 illustrates a numerical synthesis process in accordance with some embodiments described herein.

FIG. 1 illustrates a numerical synthesis process in accordance with some embodiments described herein.

Technology library 102 includes library cells and discretized delay models for the library cells. The library cells in technology library 102 can be used to create and/or optimize a circuit design. The term "library cell" refers to a cell in a technology library. The term "library cell" is to be distinguished from the term "cell instance" which is an instantiation of a library cell in a circuit design. In some embodiments, a discretized delay model models the delay for a timing arc of a library cell.

The term "library cell type" refers to a particular logical functionality. Examples of functionalities include, but are not limited to, "AND," "OR," "XOR," "multiplexor," etc. The term "library cell" refers to a particular implementation of a library cell type. A technology library can be viewed as a collection of library cells of one or more library cell types. For example, a technology library may include multiple sizes of an inverter. In this example, the term "inverter" is the library cell type, and the term "library cell" refers to an inverter implementation of a particular size.

A numerical delay model is a delay model that can be used by a numerical solver to optimize a cost function. A linear delay model is one example of a numerical delay model. More generally, an analytical formula that represents the delay behavior, and that is capable of being used to construct an optimization problem for a numerical solver, is an example of a numerical delay model.

The approach described in the above-mentioned work by Sutherland et al. produces inaccurate results for real circuit designs. Some of the reasons for the inaccuracies are now discussed. First, the logical effort and parasitic delay values for library cells of a particular cell type can have a very large variance. Also, the rise and fall delay characteristics of a cell can be quite different. In the Sutherland approach, the modeling error for each gate in the path has a multiplicative effect in the overall path effort. The overall path effort can therefore have a very large error, and the resulting sizes of the cells and the delay of the path computed by the Sutherland approach can be far from optimal.

Second, the Sutherland approach assumes that there is a large range of gate sizes available for each cell type in the technology library and that this assumption holds true for all of the cells in the path being optimized. In practice, however, technology libraries can have a very limited range of gate sizes. When a path has a number of cells with limited range of sizes, then the sizes produced by the Sutherland approach for all gates in the path are sub-optimal.

Third, the Sutherland approach assumes that the number of stages for all paths from each gate to the end-points that are reachable from that gate are the same. When this assumption is violated—which is the case in nearly all real designs—then the formulation produces sub-optimal results, or we need to modify the circuit design to ensure that the assumption is satisfied. Neither of these is a good option.

Some embodiments described herein do not suffer from the above-described drawbacks in the Sutherland approach. The term "specific numerical delay model" refers to a numerical delay model that models the delay behavior of a particular timing arc of a particular library cell, or the delay behavior of a particular library cell. A specific numerical delay model is defined using a specific logical effort value and a specific parasitic delay value.

The term "generic numerical delay model" refers to a numerical delay model that models an aggregated delay behavior of either a timing arc of a library cell type or the library cell type itself. A generic numerical delay model is defined using a generic logical effort value and a generic parasitic delay value.

Examples of systems and techniques that can be used to determine specific and generic numerical delay models are described in U.S. patent application Ser. No. 13/450,178, entitled "Numerical delay model for a technology library cell and/or a technology library cell type," the contents of which are herein incorporated by reference in their entirety.

Some embodiments determine numerical delay models based on technology library 102 (operation 104). Output 106 of operation 104 can include a set of library cells and a specific numerical delay model for each library cell in the set of library cells and a generic numerical delay model for each library cell type. The set of library cells in output 106 typically includes all library cells in technology library 102, but in some embodiments certain library cells may be removed if desired.

Certain library cells that don't adhere to the assumptions of the numerical model can then be excluded (operation 108) to obtain a subset of library cells. Each library cell in the subset of library cells has a specific numerical delay model that was computed in operation 104. In some embodiments, a new generic numerical delay model can be determined for each cell type based on the specific numerical delay models corresponding to the subset of library cells. These generic numerical delay models are "new" because they are based on the subset of library cells as opposed to being based on the set of library cells that were used in operation 104 to determine the generic numerical delay models. Output 110, i.e., the subset of library cells with their specific numerical delay models and optionally the new generic numerical delay models for the library cell types, can then be provided as input to the first phase of numerical synthesis 112.

Examples of systems and techniques that can be used to exclude library cells are described in U.S. patent application Ser. No. 13/479,807, entitled "Excluding library cells for delay optimization in numerical synthesis," the contents of which are herein incorporated by reference in their entirety.

The first phase of numerical synthesis 112 sizes cells in circuit design 114 using the subset of library cells with their specific numerical delay models and the new generic numerical delay models. In some embodiments, the first phase of numerical synthesis 112 models a numerical optimization problem based on circuit design 114 and the specific and generic numerical models for the subset of library cells. Output 116 from the first phase of numerical synthesis 112 includes the numerically optimized size for each cell instance in circuit design 114. Specifically, in some embodiments, output 116 includes the numerically optimized (and desired) input capacitance value for each optimized cell instance in the circuit design 114.

Output 116 is then provided as one of the inputs to the second phase of numerical synthesis 118. The other inputs to second phase of numerical synthesis 118 include the library cells in technology library 102 and output 106 which includes the numerical delay models that were generated by operation 104. The second phase of the numerical synthesis 118 then instantiates cells that have the numerically optimized and desired cell sizes in circuit design 114 to produce optimized circuit implementation 120 using the discrete library cells from technology library 102. In particular, for each cell instance in circuit design 114, the second phase of numerical synthesis 118 selects a library cell that best matches the numerically optimized size, (if a library cell with exactly the optimized size is not available, a library cell with nearly the optimized size is selected) from the set of library cells that were part of output 106. In some embodiments, second phase of numerical synthesis 118 also receives output 110 as input (shown in FIG. 1 using a dashed line). Specifically, second phase of numerical synthesis 118 can use the fact that certain cells were excluded from output 106 to determine which cells to instantiate.

The reason a subset of library cells is used in the first phase and all library cells in technology library 102 is used in the second phase is as follows. The first phase determines numerically optimized cell sizes by solving a numerical optimization problem. In this phase, it is desirable to restrict the search space to library cells that can be accurately modeled using a logical effort and parasitic delay based numerical modeling approach. Therefore, a subset of library cells is used in this phase to restrict the search space. Once the numerically optimized cell sizes have been determined, it is important to enable the circuit synthesis process to select cell instances from a wide range of library cells. Therefore, in the second phase, the restriction on the search space is relaxed and the set of library cells from output 106 is used.

Figure 2:
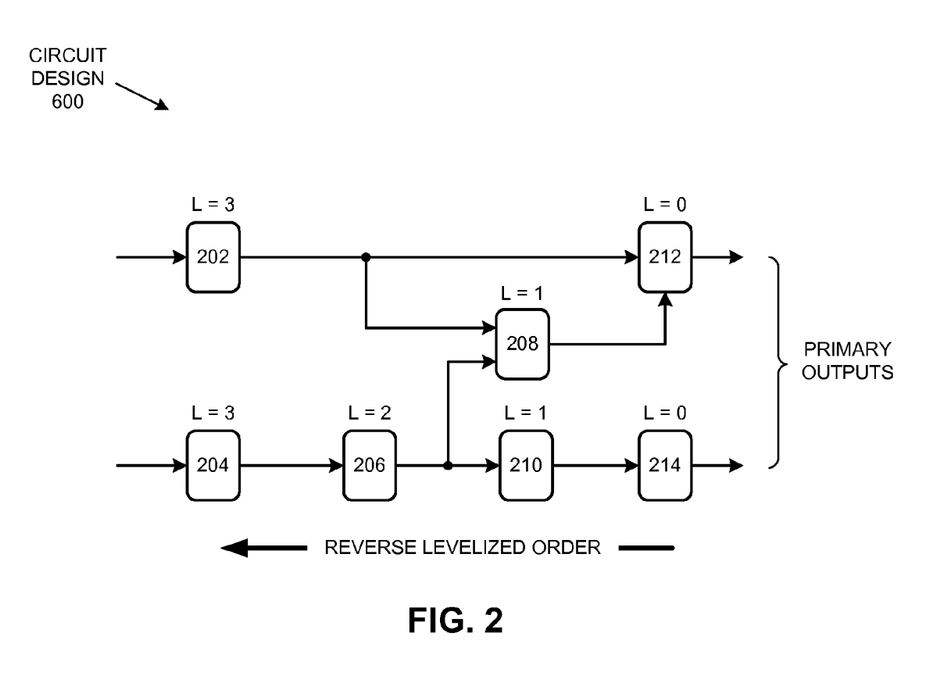
FIG. 2 illustrates a reverse-levelized processing order in accordance with some embodiments described herein.

Some embodiments described herein optimize gates in a reverse-levelized order. FIG. 2 illustrates a reverse-levelized processing order in accordance with some embodiments described herein. In the figure, the notation "L=n," where n is a number denotes that the level associated with the logic gate is equal to n. Circuit design 200 includes logic gates 202-214 that have been assigned levels 0 through 3. Logic gates 212-214, whose outputs are the primary outputs of circuit design 600, are assigned level 0. All other logic gates are assigned a level that is greater than the highest level associated with the logic gates that are electrically coupled to the logic gate's outputs. For example, logic gates 208-210 are assigned level 1, logic gate 206 is assigned level 2, and logic gates 202-204 are assigned level 3. In a reverse-levelized processing order, the optimization process optimizes logic gates in increasing order of the levels shown in FIG. 2. For example, some embodiments described herein would optimize logic gates 212 and 214 before optimizing logic gates 208 and 210, and so forth. The above description of the reverse-levelized order was provided for illustration purposes only, and is not intended to limit the embodiments described herein to a particular gate optimization order. It will be apparent to a person having ordinary skill in the art that the gates can be optimized in any desired order.

Process for Optimizing a Circuit Design

Figure 3:
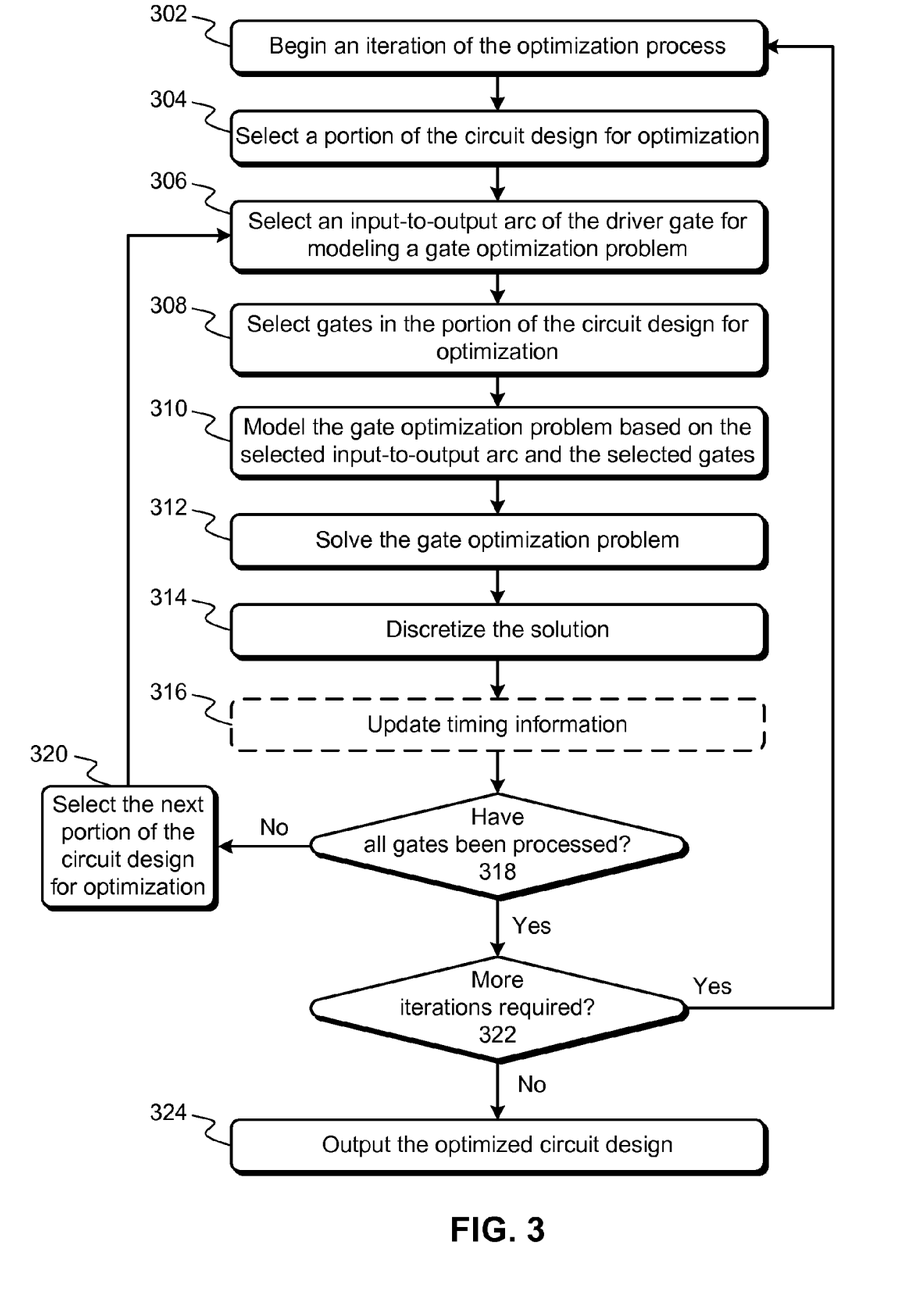
FIG. 3 illustrates a process for optimizing a circuit design in accordance with some embodiments described herein.

FIG. 3 illustrates a process for optimizing a circuit design in accordance with some embodiments described herein. The process can be performed by a computer system, and the circuit design that is being optimized can generally be at any abstraction level, e.g., the circuit design can be a logical design or a physical design.

An embodiment (e.g., a computer system) can begin an iteration of the optimization process (operation 302). In operation 302, the timing information (e.g., arrival times, required times, slack values, margin values, etc.) of the circuit design can be updated. If the process shown in FIG. 3 is performed in the context of a larger physical synthesis flow, then the timing information of the circuit design may already be up-to-date. For updating timing information, the specific logical effort and parasitic delay values of the library cell instances in the circuit design (as opposed to the generic logical effort and parasitic delay values of the cell types) are used to improve the accuracy of the timing information.

The gate sizes that are determined after an iteration of the optimization process can be further optimized by performing additional iterations of the optimization process. In practice, only a few iterations (typically two iterations) of the optimization process may be required to converge to an optimal solution. The gates of the circuit design can generally be processed in any given order. In some embodiments, the gates can be processed in a reverse-levelized processing order as explained in reference to FIG. 2.

Next, the embodiment can select a portion of the circuit design for optimization (operation 304). The selected portion of the circuit design includes a driver gate and one or more gates in an output cone associated with an output of the driver gate (a gate is in an output cone associated with an output of a driver gate if a path exists from the output of the driver gate to at input of the gate).

Figure 4:
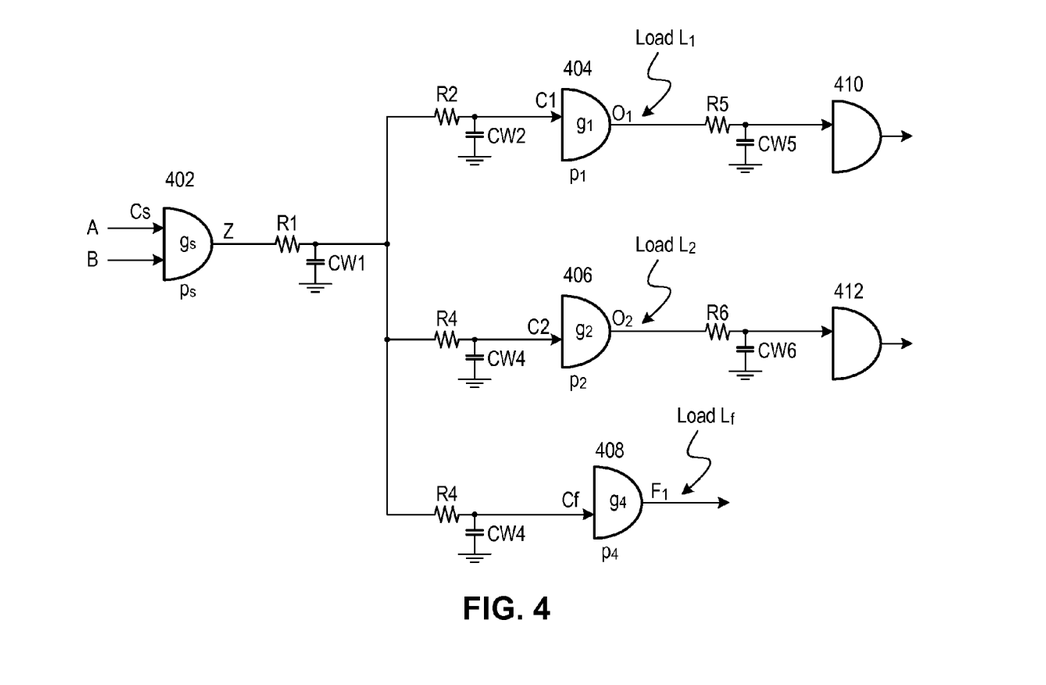
FIG. 4 illustrates a portion of the circuit design that can be selected for optimization in accordance with some embodiments described herein.

FIG. 4 illustrates a portion of the circuit design that can be selected for optimization in accordance with some embodiments described herein. As shown in FIG. 4, the output of driver gate 402 is electrically connected to the inputs of gates 404-408, and the outputs of gates 404 and 406 are electrically connected to the inputs of gates 410 and 412, respectively. Note that gates 404-412 are in the output cone of the driver gate 402.

The electrical behavior of the wires that electrically connect outputs and inputs can be modeled using a network of resistances and capacitances as shown in FIG. 4. For example, the electrical behavior of the wire that electrically connects the output of driver gate 402 with the inputs of gates 404-408 is modeled using a network of resistances R1-R4 and capacitances CW1-CW4. Likewise the electrical behavior of the wire that electrically connects the output of gate 404 with the input of gate 410 is modeled using resistance R5 and capacitance CW5, and the electrical behavior of the wire that electrically connects the output of gate 406 with the input of gate 412 is modeled using resistance R6 and capacitance CW6.

The inputs capacitances for gates 402-408 are Cs, C1, C2, and Cf, respectively. The labels $O_1$, $O_2$, and $F_1$ correspond to the output pins of gates 404, 406, and 408, respectively. The loads at $O_1$, $O_2$, and $F_1$, are $L_1$, $L_2$, and $L_f$, respectively. For this example, some embodiments formulate the following delay optimization problem: determine the values of C1 and C2 that produce the best possible delays at $O_1$ and $O_2$ (optionally with minimal area).

Continuing with the discussion of FIG. 3, the embodiment then selects an input-to-output arc of the driver gate for modeling a gate optimization problem (operation 306).

Since the driver gate is fixed when the portion of the circuit design shown in FIG. 4 is optimized, the embodiment utilizes the specific numerical delay model (i.e., specific logical effort and parasitic delay values) of the driver gate. In the first iteration, the specific logical effort and parasitic delay values of the driver gate correspond to the original library cell that was assigned to the driver gate. In subsequent iterations, the specific logical effort and parasitic delay values correspond to the library cell that is assigned to the driver gate in the previous iteration. The use of the specific numerical delay model (i.e., specific logical effort and parasitic delay values) is important since it is more accurate than the generic numerical delay model (i.e., the generic logical effort and parasitic delay values) of the library cell type corresponding to the driver gate.

The following alternatives can be used for selecting the input-to-output arc of the driver gate. The first alternative is to use the driver gate input (and the corresponding input-to-output arc) that produces the worst arrival time at the output of the driver gate. The arrival time at the inputs of the driver gate may be the one that is determined in operation 316 discussed below (i.e., in the previous iteration), or the one that is kept up-to-date during the levelized pass. A second alternative is to use the average driver input capacitances and the average specific logical effort and parasitic delay values, wherein the averages are computed over all input-to-output arcs that begin from the inputs of the driver gate and end in the output of the driver gate for which the optimization problem is being modeled. In a third alternative, optimal gate sizes are estimated for all input-to-output arcs that begin from the inputs of the driver gate and end in the outputs of the gates that are being optimized (i.e., the selected gates for which the optimization problem is being modeled). In this alternative, the input-to-output arc that yields the worst arrival time across all of the outputs of the optimized selected gates is selected. Optimal gate sizes can be estimated using the closed-form solver described in U.S. patent application Ser. No. 13/537,880, entitled "Estimating optimal gate sizes by using numerical delay models," the contents of which are herein incorporated by reference in their entirety for all purposes.

Once the input-to-output arc is determined, the input capacitance value and the specific logical effort and parasitic delay values corresponding to the selected input-to-output arc of the driver gate are used for modeling the optimization problem. For example, the embodiment may select input-to-output arc A→Z for driver gate 402. The specific logical effort and specific parasitic delay values for the input-to-output arc A→Z for gate 402 are $g_s$ and $P_s$, respectively.

Continuing with the discussion of FIG. 3, the embodiment then selects gates in the portion of the circuit design for optimization (operation 308). Embodiments that use a reverse-levelized processing order may select gates that are in a given range of levels. For example, the embodiment may select gates 404 and 406 for optimization, and treat gate 408 as a fixed load. The generic logical effort values for gates 404-408 are $g_1$, $g_2$, and $g_4$, respectively. The generic parasitic delay values for gates 404-408 are $p_1$, $p_2$, and $p_3$, respectively.

Some embodiments select gates for optimization as follows. First, any gates that have been identified as unconstrained loads (i.e., loads that are not supposed to be optimized) are treated as fixed load. Some of the gates of the net may not be violating in the original design. These gates can also be treated as fixed loads. If a gate is violating (i.e., it has a negative slack), but the improvement in arrival time to the output is not observable (i.e., the improvement does not lead to improvements in the overall design's timing), then the gate is treated as a fixed load. The notion of observability can be used in two ways. First, if at least one of the outputs of the gate has a margin of 0, then any improvement in the arrival time of that input is considered to be observable, and hence the gate is selected for optimization. Further details of systems and techniques for determining timing margins can be found in U.S. application Ser. No. 12/783,915, entitled "Global timing modeling within a local context," the contents of which are herein incorporated by reference in their entirety. Second, if at least one of the outputs of the gate (hereinafter G1) drives an input of another gate (hereinafter G2), and the arrival time at that input of gate G2 is worse than the arrival time at any other input of gate G2, or if the output of gate G1 is an end-point of the design, then any improvement in the arrival time of the input of gate G1 is considered to be observable, and hence gate G1 is selected for optimization.

In embodiments that use a reverse-levelized processing order, the gates that are not in the current level are treated as fixed loads. In these embodiments, if the level of a gate is smaller than the current level, then the fixed load is the input capacitance of the library cell type that was determined for that gate in the current iteration. On the other hand, if the level of the gate is larger than the current level, then the fixed load is the input capacitance of the library cell type that was determined for that gate in the previous iteration, or it is the original library cell type if the current iteration is the first iteration.

After the embodiment determines the fixed loads, the remaining gates in the portion of the circuit design are selected for optimization. If no gates remain, then the process can skip operations 310-316. On the other hand, if at least one gate was selected for optimization, then the embodiment models the gate optimization problem based on the selected input-to-output arc and the selected gates (operation 310). For example, in FIG. 4, the embodiment can model the delays from pin A to output pins $O_1$, $O_2$, and $F_1$, and construct an objective function that minimizes the maximum of these three delays. Modeling the gate optimization problem can involve collecting (e.g., by retrieving values stored in memory locations) circuit information, and constructing expressions for determining values of entities (e.g., the conjugate gradient of the objective function) that are required for optimization. Some systems and techniques for modeling the gate optimization problem are described in U.S. patent application Ser. No. 13/562,189, entitled "Determining optimal gate sizes by using a numerical solver," filed on 30 Jul. 2012, the contents of which are herein incorporated by reference in their entirety.

Note that modeling the delays from pin A to output pins $O_1$, $O_2$, and $F_1$ includes modeling the delay of the wire topology that electrically connects pin Z to gates 404-408. In general, any wire load model can be used. For example, an Elmore wire load model can be used. Systems and techniques for efficiently computing the Elmore wire delay are described in U.S. patent application Ser. No. 13/485,600, entitled "Incremental Elmore delay calculation," the contents of which are herein incorporated by reference in their entirety. Other wire load models that can be used include, but are not limited to, a best case wire load model (which is a model that ignores the wire resistance and models the wire load using a single lumped capacitance), a worst case wire load model (which is a model that uses a lumped resistance and a lumped capacitance to model the wire load), and a balanced-tree wire load model (which is a model that distributes the total capacitance and resistance of the wire equally across each branch, and uses a lumped capacitance and lumped resistance to model the wire load of each branch).

Continuing with the discussion of FIG. 3, the embodiment can then solve the gate optimization problem (operation 312). For example, the embodiment can use a numerical solver to solve the gate optimization problem. In some embodiments, the output of this operation is a set of input capacitance values that lead to the best delay to the output of the optimized gates of the net. Some embodiments can select from multiple solvers to solve the gate optimization problem. For example, some embodiments can select from a numerical solver (such as conjugate-gradient based numerical solver), a closed-form solver, and a constraints solver based on the following criteria: (1) the closed form solver is used when the net that is being optimized has one optimizable fan-out, or when a worst-case wire model is being used where the wire resistance and capacitance is shared by all loads, and (2) the numerical solver or the constraint solver is used if the closed-form solver cannot be used. A closed-form solver is described in U.S. patent application Ser. No. 13/537,880, entitled "Estimating optimal gate sizes by using numerical delay models," the contents of which are herein incorporated by reference in their entirety. Some systems and techniques for solving a gate optimization problem using a numerical solver are described in U.S. patent application Ser. No. 13/562,189, entitled "Determining optimal gate sizes by using a numerical solver," filed on 30 Jul. 2012, the contents of which are herein incorporated by reference in their entirety. In some embodiments, the closed-form solver is used to determine a seed for the numerical solver or the constraint solver.

In some embodiments, multiple solvers (e.g., a numerical solver, a constraint solver, a close-form formula, etc.) are used. These embodiments can select a solver from the multiple solvers based on the characteristics of the optimization problem. Once a solver is selected, the optimization problem can be modeled accordingly and solved using the selected solver. For example, as explained above, an embodiment can decide to use the closed-form solution (instead of a conjugate-gradient based numerical solver) if the net that is being optimized has one optimizable fan-out, or when a worst-case wire model is being used where the wire resistance and capacitance is shared by all loads.

In some embodiments, a first solver (which is known to be correct) can be used to debug an optimization process that uses a second solver. For example, an embodiment can create two formulations for the same optimization problem—one formulation for each solver. Next, the embodiment can solve the two formulations, e.g., by executing the two solvers in parallel. If the solution produced by the second solver does not match the solution produced by the first solver (which is known to be correct), then the discrepancy in the two solutions can be used to debug the second solver.

Note that solving the gate optimization problem produces the optimal gate sizes (in terms of desired input capacitances of optimized cells) without the need for enumerating the possible size combinations of the net loads and performing timing calculations to the output of the optimized gates for each of the combinations. This leads to run-times that are order of magnitude faster than traditional optimization approaches.

Once a solution to the gate optimization problem is obtained, the embodiment can discretize the solution (operation 314). Specifically, if the solution is a set of input capacitance values of gates that are being optimized, then the embodiment can discretize the input capacitance values. Since the numerical delay model is continuous in nature, the resulting gate optimization problem is also continuous. Therefore, the input capacitances that are output by the solver may not exactly match the input capacitances of the target technology library cells. In operation 314, the embodiment determines the technology library cell that best matches the input capacitance value that is produced by the solver(s).

Note that, when an optimized gate has multiple inputs, each of the nets connected to the inputs of that gate participate in a separate gate optimization problem. It is therefore possible that input capacitances solved for each of the inputs of the gate lead to a different discrete library cell. In such situations, a library cell from the multiple discrete library cells can be selected using one of the following approaches.

In the first approach, for each input and the corresponding discrete library cell that is solved for that input, the embodiment evaluates the arrival time to the optimized gate's output through that input (from the driver of the net connected to that input, through the input, to the output of the optimized gate). The embodiment then picks the discrete cell that produces the worst delay (i.e., the worst arrival time). This computation uses the specific logical effort and parasitic delay values of the discretized library cells and the driver cell.

In the second approach, for each input and the corresponding discrete library cell that is solved for that input, the embodiment computes the worst arrival time to the optimized gate's output starting from the inputs of the drivers of all inputs to the output of the optimized gate. The embodiment then picks the discrete cell that produces the worst delay (i.e., the worst arrival time). As before, this computation uses the specific logical effort and parasitic delay values of the discretized library cells and the driver cell.

Once the solution has been discretized, the embodiment can update timing information (operation 316). Operation 316 is optional. If the process shown in FIG. 3 is part of an overall circuit synthesis process that updates timing information, then operation 316 can be skipped. Note that the embodiment does not have to update the entire circuit design's timing information. Some embodiments only update the timing information that is required for accurately modeling the next gate optimization problem.

Continuing with the discussion of FIG. 3, the embodiment can then check if all gates have been processed (operation 318). If more gates need to be processed ("No" branch), then the embodiment can select the next portion of the circuit design for optimization (operation 320) and return to operation 306.

On the other hand, if all gates have been processed ("Yes" branch), then the embodiment can check if more iterations are required (operation 322). If no more iterations are required ("No" branch, e.g., because the gate sizes have converged to a substantially optimal value or some other termination condition has been met), then the embodiment can output the optimized circuit design (operation 324) that includes gates with the optimized gate sizes. On the other hand, if more iterations are required ("Yes" branch), the embodiment can return to operation 302 and begin the next iteration of the optimization process (note that, in the next iteration, the process will use the new gate sizes that were determined in the current iteration).

In some embodiments, the gates are optimized in a reverse-levelized processing order in each iteration. Optimizing the circuit design in this order allows the output loads on the gates that are being optimized to be modeled accurately (e.g., loads $L_1$ and $L_2$ can be accurately modeled because gates 410 and 412 would be optimized before gates 404 and 406 in a reverse-levelized processing order). Furthermore, a reverse-levelized processing order also helps the optimization process to converge faster.

Figure 5:
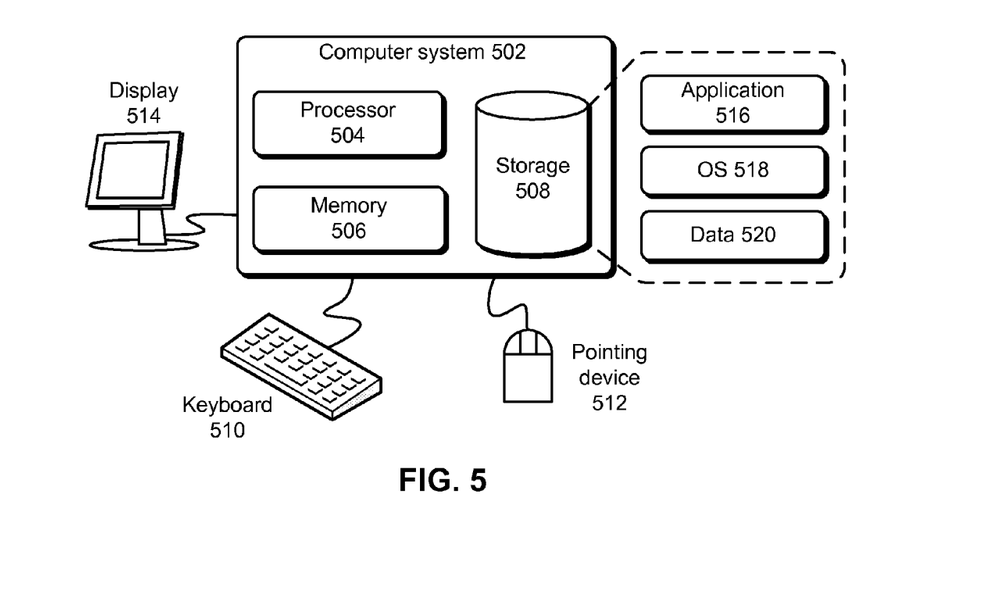
FIG. 5 illustrates a computer system in accordance with an embodiment of the present invention.

FIG. 5 illustrates a computer system in accordance with an embodiment of the present invention.

A computer system can generally be any system that can perform computations. Specifically, a computer system can be a microprocessor, an application specific integrated circuit, a distributed computing system, a cloud computing system, or any other computing system now known or later developed. Computer system 502 comprises processor 504, memory 506, and storage 508. Computer system 502 can be coupled with display 514, keyboard 510, and pointing device 512. Storage 508 can generally be any device that can store data. Specifically, a storage device can be a magnetic, an optical, or a magneto-optical storage device, or it can be based on flash memory and/or battery-backed up memory. Storage 508 can store application 516, operating system 518, and data 520.

Application 516 can include instructions that when executed by computer 502 cause computer 502 to perform one or more processes that are implicitly or explicitly described in this disclosure. Data 520 can include any data that is inputted into or outputted by application 516.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing a circuit design, the method comprising:
   receiving the circuit design; and
   optimizing, by computer, gate sizes in the circuit design, wherein said optimizing comprises iteratively performing a set of operations, the set of operations comprising:
   selecting a portion of the circuit design,
   selecting an input-to-output arc of a driver gate in the portion of the circuit design,
   selecting gates in the portion of the circuit design for optimization,
   modeling a gate optimization problem based on the selected input-to-output arc of the driver gate and the selected gates, wherein said modeling uses a specific numerical delay model for the driver gate and generic numerical delay models for the selected gates, wherein the specific numerical delay model models the delay behavior of the selected input-to-output arc of the driver gate, and wherein, for each selected gate, the generic numerical delay model models an aggregated delay behavior of a library cell type associated with the selected gate, solving the gate optimization problem to obtain a solution, and
discretizing the solution.

2. The method of claim 1, wherein the portion of the circuit design includes the driver gate and one or more gates in a fan-out cone of an output of the driver gate.

3. The method of claim 1, wherein said solving comprises using a numerical solver to solve the gate optimization problem.

4. The method of claim 3, wherein said solving comprises:
estimating gate sizes for the selected gates based on a set of closed-form expressions; and
providing the estimated gate sizes as a seed to the numerical solver.

5. The method of claim 3, wherein the numerical solver is a conjugate-gradient based numerical solver.

6. The method of claim 1, wherein said modeling the gate optimization problem includes using a wire load model.

7. The method of claim 6, wherein the wire load model is an Elmore wire load model.

8. The method of claim 6, wherein the wire load model is a best case wire load model.

9. The method of claim 6, wherein the wire load model is a worst case wire load model.

10. The method of claim 6, wherein the wire load model is a balanced-tree wire load model.

11. The method of claim 1, wherein the portion of the circuit design is selected according to a reverse-levelized processing order.

12. The method of claim 1, wherein the selected input-to-output arc is the input-to-output arc of the driver gate that produces the worst arrival time at the output of the driver gate.

13. The method of claim 1, wherein said selecting the input-to-output arc includes:
estimating optimal sizes of selected gates using a closed-form solver;
determining arrival times at the outputs of the optimized selected gates; and
selecting the input-to-output arc of the driver gate that produces the worst arrival time over all outputs of all optimized selected gates.

14. The method of claim 1, wherein gates in the portion of the circuit design that are not selected for optimization are treated as fixed loads, and wherein said modeling uses specific numerical delay models for fixed loads.

15. The method of claim 1, wherein when multiple inputs of a gate are optimized simultaneously, said discretizing includes:
determining a discretized library cell for each optimized input;
for each discretized library cell, evaluating an arrival time at the gate's output through the corresponding optimized input; and
selecting the discretized library cell that results in the worst arrival time at the gate's output.

16. The method of claim 1, wherein when multiple inputs of a gate are optimized simultaneously, said discretizing includes:
determining a discretized library cell for each optimized input;
for each discretized library cell, evaluating the worst arrival time at the gate's output over all inputs of the gate; and
selecting the discretized library cell that results in the worst arrival time at the gate's output.

17. A non-transitory computer-readable storage medium storing instructions that, when executed by a computer, cause the computer to perform a method for optimizing a circuit design, the method comprising:
receiving the circuit design; and
optimizing gate sizes in the circuit design, wherein said optimizing comprises iteratively performing a set of operations, the set of operations comprising:
selecting a portion of the circuit design,
selecting an input-to-output arc of a driver gate in the portion of the circuit design,
selecting gates in the portion of the circuit design for optimization,
modeling a gate optimization problem based on the selected input-to-output arc of the driver gate and the selected gates, wherein said modeling uses a specific numerical delay model for the driver gate and generic numerical delay models for the selected gates, wherein the specific numerical delay model models the delay behavior of the selected input-to-output arc of the driver gate, and wherein, for each selected gate, the generic numerical delay model models an aggregated delay behavior of a library cell type associated with the selected gate,
solving the gate optimization problem to obtain a solution, and
discretizing the solution.

18. The non-transitory computer-readable storage medium of claim 17, wherein the portion of the circuit design is selected according to a reverse-levelized processing order.

19. A computer system, comprising:
a processor; and
a storage medium storing instructions that, when executed by the processor, cause the computer system to perform a method for optimizing a circuit design, the method comprising:
receiving the circuit design; and
optimizing gate sizes in the circuit design, wherein said optimizing comprises iteratively performing a set of operations, the set of operations comprising:
selecting a portion of the circuit design,
selecting an input-to-output arc of a driver gate in the portion of the circuit design,
selecting gates in the portion of the circuit design for optimization,
modeling a gate optimization problem based on the selected input-to-output arc of the driver gate and the selected gates, wherein said modeling uses a specific numerical delay model for the driver gate and generic numerical delay models for the selected gates, wherein the specific numerical delay model models the delay behavior of the selected input-to-output arc of the driver gate, and wherein, for each selected gate, the generic numerical delay model models an aggregated delay behavior of a library cell type associated with the selected gate,
solving the gate optimization problem to obtain a solution, and
discretizing the solution.

20. The computer system of claim 19, wherein the portion of the circuit design is selected according to a reverse-levelized processing order.

* * * * *